United States Patent
Tomioka

(10) Patent No.: US 9,019,331 B2
(45) Date of Patent: Apr. 28, 2015

(54) OPTICAL SCANNER AND IMAGE FORMING DEVICE PROVIDED WITH THE OPTICAL SCANNER

(71) Applicant: KYOCERA Document Solutions Inc., Osaka (JP)

(72) Inventor: Hiroyuki Tomioka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/107,270

(22) Filed: Dec. 16, 2013

(65) Prior Publication Data

US 2014/0177014 A1     Jun. 26, 2014

(30) Foreign Application Priority Data

Dec. 26, 2012  (JP) .................................. 2012-282815

(51) Int. Cl.
| | |
|---|---|
| *B41J 15/14* | (2006.01) |
| *B41J 27/00* | (2006.01) |
| *H04N 1/036* | (2006.01) |
| *H04N 1/00* | (2006.01) |

(52) U.S. Cl.
CPC ........... *H04N 1/036* (2013.01); *H04N 1/00519* (2013.01)

(58) Field of Classification Search
USPC .................. 347/230, 241–243, 256–258, 263
See application file for complete search history.

(56) References Cited

U.S. PATENT DOCUMENTS 5,803,622 A *  9/1998  Mama et al. ...................... 399/4
8,780,159 B2 * 7/2014  Serizawa et al. .............. 347/245

FOREIGN PATENT DOCUMENTS

| JP | 2003-177344 | 6/2003 | |
| JP | 2008145954 A * | 6/2008 | ............. G02B 26/10 |

* cited by examiner

*Primary Examiner* — Hai C Pham
(74) *Attorney, Agent, or Firm* — Wenderoth, Lind & Ponack, L.L.P.

(57) ABSTRACT

An optical scanner includes a housing, a polygon mirror accommodated within the housing and configured to reflect light of a light source, a lens accommodated within the housing and arranged on an optical path of the light reflected by the polygon mirror, and a cover member. The cover member is mounted to the housing and is provided with an opening formed so as to expose at least a portion of the lens. The opening is closed by a seal member which is attached to a portion of the lens exposed from the opening and an outer wall surface of the cover member existing around the opening.

5 Claims, 5 Drawing Sheets

OPTICAL SCANNER AND IMAGE FORMING DEVICE PROVIDED WITH THE OPTICAL SCANNER

CROSS-REFERENCE TO RELATED APPLICATION(S)

This application is based upon and claims the benefit of priority from Japanese Patent Application(s) No. 2012-282815 filed on Dec. 26, 2012, the entire contents of which are incorporated herein by reference.

BACKGROUND

The technology of the present disclosure relates to an optical scanner for use in, e.g., an image forming device such as a copier, a printer or the like and an image forming device provided with the optical scanner.

In general, an optical scanner includes a housing, a polygon mirror, an imaging lens and a cover member mounted to the housing. The polygon mirror and the imaging lens are accommodated within the housing.

In this optical scanner, the light of a light source is reflected by the polygon mirror and is incident on a photosensitive drum of an image forming device through the imaging lens. Since the polygon mirror is rotationally driven, the reflected light of the polygon mirror passed through the imaging lens scans the surface of the photosensitive drum. Thus, an electrostatic latent image is formed on the surface of the rotating photosensitive drum.

If dust entering the housing of the optical scanner adheres to a reflection surface of the polygon mirror, there is posed a problem in that an image becomes poor due to a reduced light quantity or other causes.

As a solution to this problem, there is known an optical scanner in which an urethane foam is compressed and inserted into a clearance between the imaging lens and the cover member. With this configuration, the polygon mirror is sealed by the housing, the cover member, the urethane foam and the imaging lens. This restrains dust from adhering to the polygon mirror.

The temperature of a lens tends to increase during the use of the optical scanner. If the lens temperature increases to a great extent, the optical properties of the lens undergo a change. This poses a problem in that an optical scanning accuracy decreases and an image becomes poor.

The aforementioned optical scanner has a structure in which the urethane foam and the cover member overlap in two layers on the imaging lens. For that reason, it is difficult to efficiently dissipate heat from the imaging lens through the urethane foam and the cover member. Since the urethane foam itself has a heat insulating property, it become more difficult to reduce the temperature of the imaging lens.

SUMMARY

An optical scanner according to one aspect of the present disclosure includes a housing, a polygon mirror accommodated within the housing and configured to reflect light of a light source, a lens accommodated within the housing and arranged on an optical path of the light reflected by the polygon mirror, and a cover member mounted to the housing and provided with an opening formed so as to expose at least a portion of the lens.

The opening is closed by a seal member which is attached to a portion of the lens exposed from the opening and an outer wall surface of the cover member existing around the opening.

An image forming device according to another aspect of the present disclosure is provided with the optical scanner.

DETAILED DESCRIPTION

Embodiments of the present disclosure will now be described with reference to the accompanying drawings. The technology of the present disclosure is not limited to the embodiments described herein below.

Figure 1:
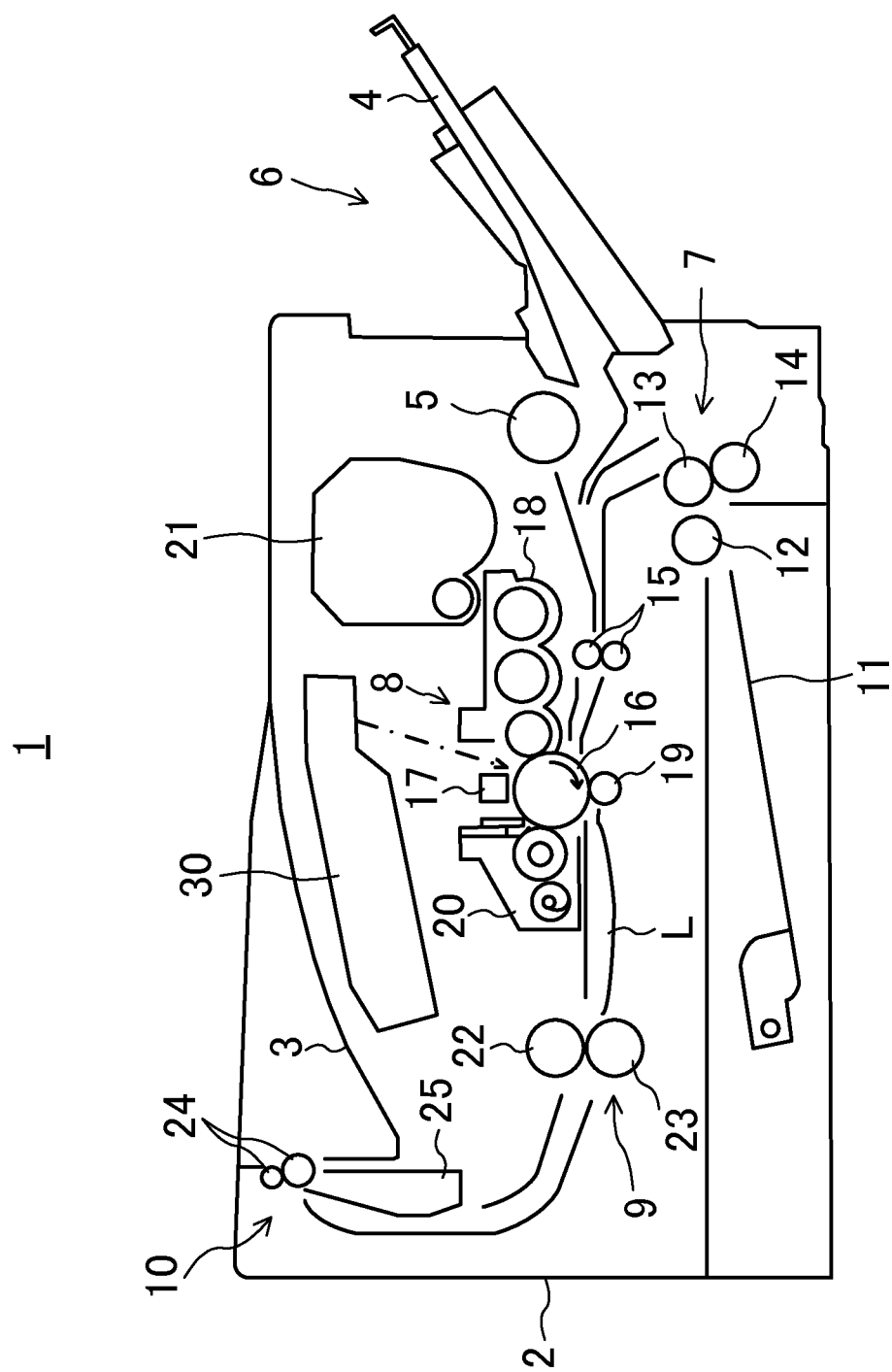
FIG. 1 is a sectional view showing a schematic configuration of an image forming device according to one embodiment of the present disclosure.

FIG. 1 is a sectional view showing a schematic configuration of a laser printer 1 as an image forming device according to one embodiment of the present disclosure.

As shown in FIG. 1, the laser printer 1 includes a box-shaped printer body 2, a manual paper feeding unit 6, a cassette paper feeding unit 7, an image forming unit 8, a fixing unit 9 and a paper discharge unit 10. The laser printer is configured such that, while conveying a paper along a conveying path L within the printer body 2, the laser printer 1 forms an image on the paper based on image data transmitted from a terminal not shown or the like.

The manual paper feeding unit 6 includes a manual insertion tray 4 provided in one side portion of the printer body 2 so that it can be opened and closed, and a manual-insertion-purpose paper feeding roller 5 rotatably provided within the printer body 2.

The cassette paper feeding unit 7 is provided in the bottom portion of the printer body 2. The cassette paper feeding unit 7 includes a paper feeding cassette 11 for retaining a plurality of papers overlapped one above another, a pick roller 12 for taking out, one by one, the papers held within the paper feeding cassette 11, a feed roller 13 for separating the taken-out papers one by one and sending the papers to the conveying path L, and a retard roller 14.

The image forming unit 8 is provided above the cassette paper feeding unit 7 within the printer body 2. The image forming unit 8 includes a photosensitive drum 16 as an image carrier, an electrifier 17, a developing unit 18, a transfer roller 19, a cleaning unit 20, a laser scanning unit (LSU) 30 as an optical scanner, and a toner hopper 21. The photosensitive drum 16 is rotatably provided within the printer body 2. The electrifier 17, the developing unit 18, the transfer roller 19 and a cleaning unit 20 are disposed around the photosensitive drum 16. The laser scanning unit 30 and the toner hopper 21 are disposed above the photosensitive drum 16. Thus, the image forming unit 8 is configured to form an image on the paper supplied from the manual paper feeding unit 6 or the cassette paper feeding unit 7.

A pair of register rollers 15 for temporarily keeping the paper on standby and then supplying the paper to the image forming unit 8 at a predetermined timing is provided in the conveying path L.

The fixing unit 9 is disposed at one side of the image forming unit 8. The fixing unit 9 includes a fixing roller 22 and a pressing roller 23 which are pressed against each other and are rotated together. The fixing unit 9 is configured to fix a toner image, which is transferred to the paper by the image forming unit 8, to the paper.

The paper discharge unit 10 is provided above the fixing unit 9. The paper discharge unit 10 includes a paper discharge tray 3, a pair of paper discharge rollers 24 for conveying the paper to the paper discharge tray 3 and a plurality of conveyance guide ribs 25 for guiding the paper to the paper discharge rollers 24. The paper discharge tray 3 is formed in the upper portion of the printer body 2 to have a concave shape.

If the laser printer 1 receives image data, the photosensitive drum 16 of the image forming unit 8 is rotationally driven and the surface of the photosensitive drum 16 is electrified by the electrifier 17.

Based on the image data, laser light is emitted from the laser scanning unit 30 toward the photosensitive drum 16. An electrostatic latent image is formed on the surface of the photosensitive drum 16 by the irradiation of the laser light. The electrostatic latent image formed on the photosensitive drum 16 is developed by the developing unit 18 and is visualized as a toner image.

Thereafter, the paper is pressed against the surface of the photosensitive drum 16 by the transfer roller 19. Thus, the toner image of the photosensitive drum 16 is transferred to the paper. The paper to which the toner image is transferred is heated and pressed by the fixing roller 22 and the pressing roller 23 in the fixing unit 9. As a result, the toner image is fixed to the paper.

Figure 2:
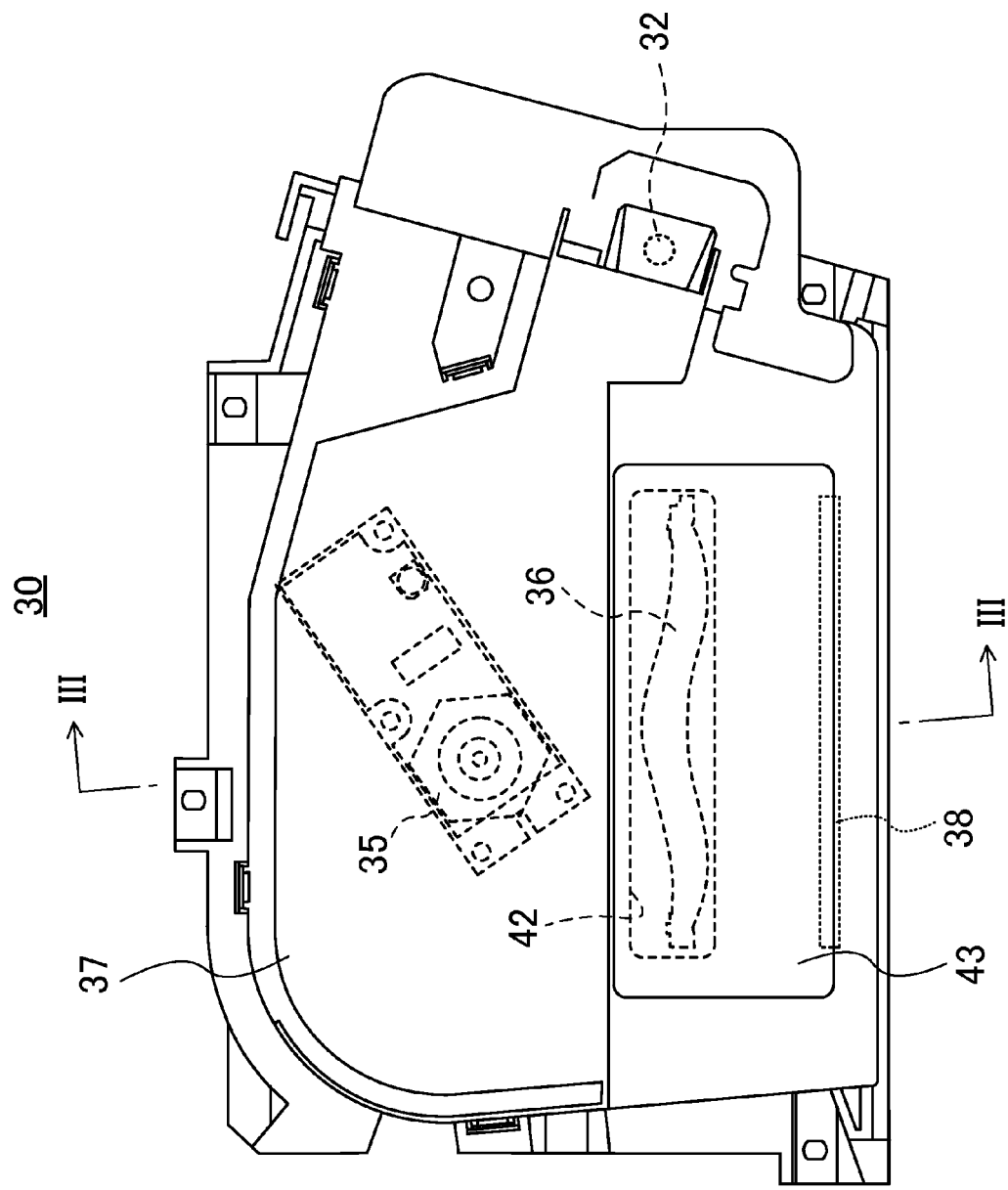
FIG. 2 is a plan view showing an outward appearance of an optical scanner according to one embodiment of the present disclosure.
Figure 3:
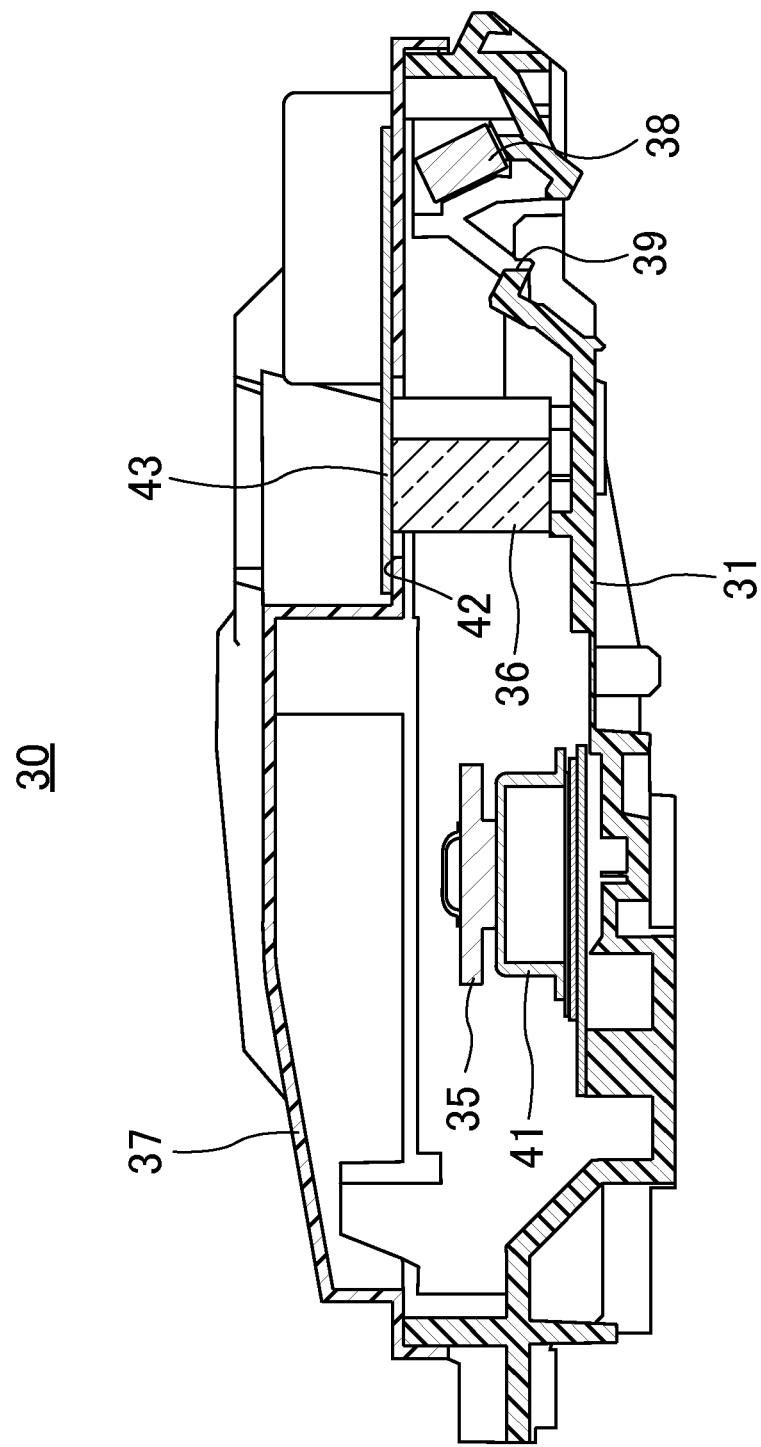
FIG. 3 is a sectional view taken along line III-III in FIG. 2.

FIG. 2 is a plan view showing the outward appearance of the laser scanning unit 30 as an optical scanner according to one embodiment of the present disclosure. FIG. 3 is a sectional view taken along line III-III in FIG. 2.

As shown in FIGS. 2 and 3, the laser scanning unit 30 includes a housing 31, a polygon mirror 35 accommodated within the housing 31 so as to reflect the light of a light source 32, an imaging lens 36 provided within the housing 31 and arranged on an optical path of the light reflected by the polygon mirror 35, and a cover member 37 mounted to the housing 31.

The housing 31 is formed of a box-shaped member whose ceiling portion is opened. The housing 31 is made from, e.g., a resin material whose strength is increased by glass fibers. The open ceiling portion of the housing 31 is covered with the cover member 37. The cover member 37 is made from, e.g., a black resin material.

As shown in FIG. 3, the polygon mirror 35 is provided in the bottom portion of the housing 31 through a polygon motor 41. The polygon mirror 35 is a rotary polygon mirror and is rotationally driven by the polygon motor 41.

As shown in FIG. 2, the light source 32 is arranged in one side portion of the housing 31. The light source 32 is a laser light source having, e.g., laser diodes. The light source 32 is configured to emit laser light toward the polygon mirror 35. While not shown in the drawings, for example, a collimator lens and a cylindrical lens are arranged between the light source 32 and the polygon mirror 35.

As shown in FIGS. 2 and 3, the imaging lens 36 is installed in the bottom portion of the housing 31 at one side of the polygon mirror 35. The imaging lens 36 extends in an elongated shape along the bottom of the housing 31. As shown in FIG. 3, the imaging lens 36 has a rectangular cross section.

A folding mirror 38 is arranged within the housing 31 at the opposite side of the imaging lens 36 from the polygon mirror 35. The folding mirror 38 extends in an elongated shape along the imaging lens 36. The lateral cross section of the folding mirror 38 is formed into a rectangular shape.

As shown in FIG. 3, an opening 39 is formed in the region of the housing 31 facing the folding mirror 38. The light reflected by the folding mirror 38 is emitted to the outside of the housing 31 through the opening 39. The opening 39 is kept opened and is not sealed by a dustproof glass.

The laser light emitted from the light source 32 is converted to parallel light beams by, e.g., a collimator lens, and is then condensed onto the reflection surface of the polygon mirror 35 by a cylindrical lens. The light condensed onto the polygon mirror 35 is reflected by the reflection surface of the polygon mirror 35 and is incident on the imaging lens 36 as scanning light. The scanning light passed through the imaging lens 36 is reflected by the folding mirror 38 to travel through the opening 39 toward the photosensitive drum 16 arranged outside the housing 31. The scanning light is focused on the surface of the photosensitive drum 16.

The scanning light focused on the surface of the photosensitive drum 16 scans the surface of the photosensitive drum 16 in a main scanning direction according to the rotation of the polygon mirror 35 and scans the surface of the photosensitive drum 16 in an auxiliary scanning direction according to the rotation of the photosensitive drum 16, thereby forming an electrostatic latent image on the surface of the photosensitive drum 16.

In the present embodiment, the cover member 37 has an opening 42 formed such that at least a portion of the imaging lens 36 is exposed from the opening 42. As shown in FIG. 2, the opening 42 is formed into, e.g., a rectangular shape. Particularly, in the present embodiment, the opening 42 is formed such that the imaging lens 36 as a whole is exposed from the opening 42.

The opening 42 is closed by a seal member 43 which is attached to the portion of the opening 42, from which the imaging lens 36 is exposed, and the outer wall surface of the cover member 37 existing around the opening 42.

The seal member 43 is preferably formed of a sheet-like member. More preferably, the seal member 43 is formed of an adhesive sheet. It is preferred that the seal member 43 is a laser caution label which urges a user to be careful in handling the laser light source.

In particular, with a view to further increase the heat dissipation of the imaging lens 36, it is preferred that the seal member 43 is higher in heat conductivity than the cover member 37 and is formed to have a material such as a metal or the like. For example, it is desirable that the seal member 43 is formed of a laser caution label made from an adhesive sheet having a metal foil layer. The seal member 43 is not limited to these configurations but may be made from other materials such as an epoxy-based resin and the like.

In the present embodiment, the surface (upper surface) of the imaging lens 36 exposed from the opening 42 is disposed on the same plane as the outer wall surface of the cover member 37 existing around the opening 42. In other words, the upper surface of the imaging lens 36 is flush with the outer wall surface of the cover member 37. By doing so, the seal member 43 is attached to the upper surface of the imaging lens 36 and the outer wall surface of the cover member 37 on the same plane.

Therefore, according to the present embodiment, the seal member 43 is attached to the imaging lens 36 with the opening 42 of the cover member 37 closed by the seal member 43. Thus, the polygon mirror 35 can be hermetically sealed by the imaging lens 36, the seal member 43, the cover member 37 and the housing 31. As a result, it is possible to prevent dust from adhering to the polygon mirror 35. In addition, the opening 39 through which the light coming from the folding mirror 38 is emitted need not be closed by a dustproof glass. This makes it possible to omit the dustproof glass.

Moreover, as shown in FIG. 3, at least a portion of the imaging lens 36 is configured to overlap with only the seal member 43 without overlapping with the cover member 37. Thus, it is possible to efficiently dissipate heat from the imaging lens 36 through the seal member 43. That is to say, according to the configuration of the present embodiment, the heat dissipation of the imaging lens 36 can be enhanced while preventing dust from adhering to the polygon mirror 35.

Since the seal member 43 has a material higher in heat conductivity than the cover member 37, the cover member 37 can be made from a suitable material regardless of the heat conductivity value thereof. It is also possible to efficiently dissipate heat from the imaging lens 36 through the seal member 43 higher in heat conductivity than the cover member 37.

Inasmuch as the seal member 43 is formed of an adhesive sheet, the seal member 43 can be attached, with improved workability, to the imaging lens 36 and the outer wall surface of the cover member 37 using a simple method, namely a method of bonding an adhesive sheet. In addition, the heat dissipation of the imaging lens 36 is further enhanced because the seal member 43 is made from a relatively thin sheet material.

Since the seal member 43 is formed using a laser caution label which has been conventionally required to be attached to an optical scanner, there is no need to add a new member as the seal member 43. Accordingly, it is possible to prevent adherence of dust to the polygon mirror 35 and to enhance heat dissipation of the imaging lens 36 while reducing the number of parts. Moreover, it is possible to suppress an increase in the number of fabrication steps of the laser scanning unit 30 because the step of attaching the seal member 43 to the cover member 37 is performed simultaneously with the step of bonding the laser caution label.

Since the surface of the imaging lens 36 exposed from the opening 42 is disposed on the same plane as the outer wall surface of the cover member 37 existing around the opening 42, the respective attachment surfaces of the seal member 43 are positioned on the same plane. Accordingly, it is possible to easily and reliably attach the seal member 43 to the imaging lens 36 and the outer wall surface of the cover member 37.

Since the laser printer 1 is provided with the aforementioned laser scanning unit 30, it is possible to prevent dust from adhering to the polygon mirror 35 and to restrain an image from becoming poor due to a decrease in the light quantity. Furthermore, since the heat dissipation of the imaging lens 36 is enhanced, it is possible to restrain an image from becoming poor due to a reduction in the optical scanning accuracy.

In the aforementioned embodiment, the surface of the imaging lens 36 exposed from the opening 42 is disposed on the same plane as the outer wall surface of the cover member 37 existing around the opening 42. However, the technology of the present disclosure is not limited thereto.

Figure 4:
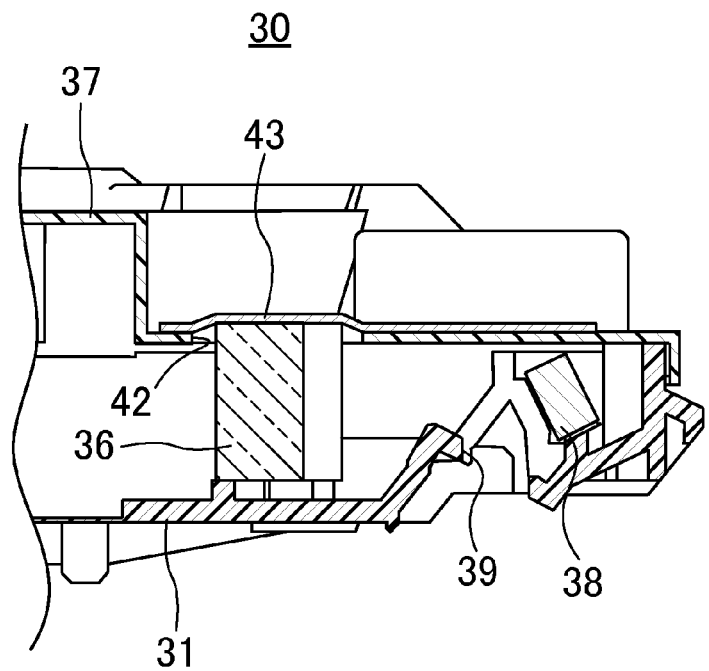
FIG. 4 is a sectional view showing a portion of an optical scanner according to another embodiment.
Figure 5:
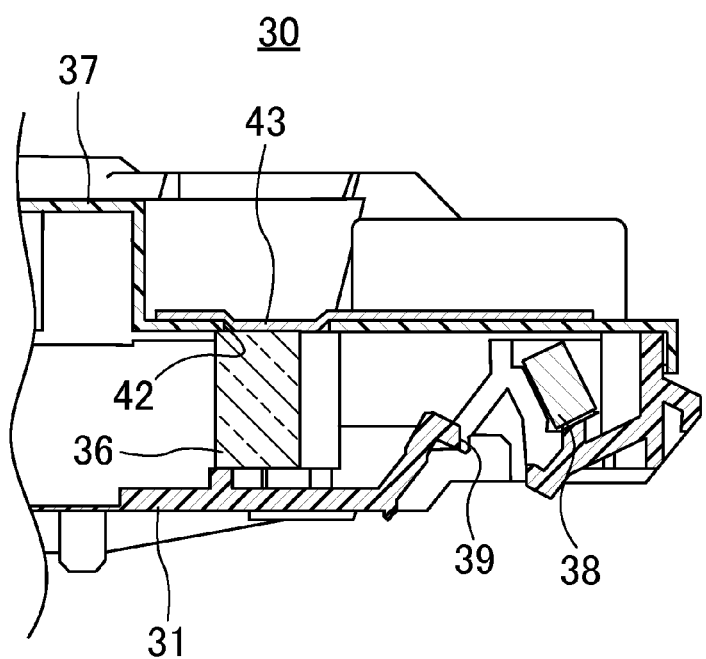
FIG. 5 is a sectional view showing a portion of an optical scanner according to a further embodiment.
Figure 6:
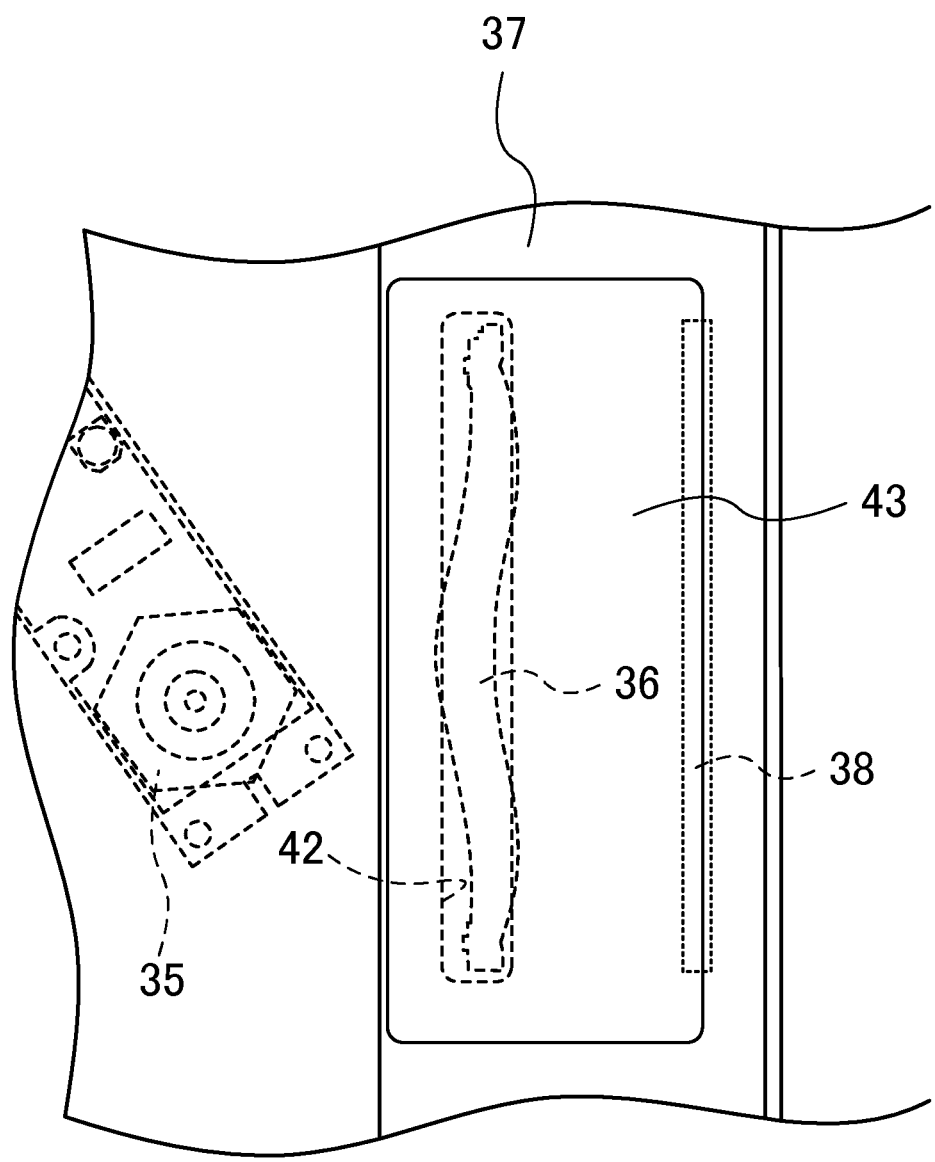
FIG. 6 is a plan view corresponding to FIG. 5.

FIGS. 4 and 5 are sectional views showing portions of laser scanning units 30 according to other embodiments. FIG. 6 is a plan view corresponding to FIG. 5.

For example, as shown in FIG. 4, the surface (upper surface) of the imaging lens 36 exposed from the opening 42 may be disposed more outward (upward in FIG. 4) than the outer wall surface of the cover member 37 existing around the opening 42. At this time, the imaging lens 36 as a whole is exposed from the opening 42.

Furthermore, as shown in FIGS. 5 and 6, the surface (upper surface) of the imaging lens 36 exposed from the opening 42 may be disposed more inward (downward in FIG. 5) than the outer wall surface of the cover member 37 existing around the opening 42. The inner wall surface of the cover member 37 existing around the opening 42 makes contact with the upper surface of the imaging lens 36. At this time, only a portion of the imaging lens 36 is exposed from the opening 42.

With the configurations shown in FIGS. 4 to 6, the opening 42 can be closed by the seal member 43 attached to the exposed portion of the imaging lens 36 and the outer wall surface of the cover member 37. Accordingly, as with the aforementioned embodiment, it is possible to enhance the heat dissipation of the imaging lens 36 while preventing adherence of dust to the polygon mirror 35.

Depending on the arrangement of the polygon mirror 35, it is often the case that a portion of the imaging lens 36 (e.g., the left half portion of the imaging lens 36 shown in FIG. 2) becomes higher in temperature. In this case, the region of the imaging lens 36 becoming higher in temperature may be disposed within the opening 42 and may be attached to the seal member 43. The region of the imaging lens 36 not becoming higher in temperature may be arranged to overlap with the cover member 37. In this way, for example, the end portion of the imaging lens 36 in the longitudinal direction (in the main scanning direction) (e.g., the right half portion of the imaging lens shown in FIG. 2) may be configured to overlap with the cover member 37.

In the present embodiment, the laser scanning unit 30 has been described as one example of the optical scanner. However, the optical scanner according to the technology of the present disclosure is not limited thereto but may be other optical scanner in which the polygon mirror 35 and the imaging lens 36 are accommodated within the housing 31 and the cover member 37.

The lens attached to the seal member 43 is not limited to the imaging lens 36 but may be other lens provided on the optical path of the light reflected by the polygon mirror 35.

In the present embodiment, the laser printer 1 has been described as one example of the image forming device. However, the image forming device according to the technology of the present disclosure is not limited thereto but may be other image forming device such as a copier, a scanner, a multi-function peripheral or the like.

As described above, the technology of the present disclosure is useful in an optical scanner for use in an image forming device such as a copier, printer or the like and an image forming device provided with the optical scanner.

What is claimed is:

1. An optical scanner, comprising:
 a housing;
 a polygon mirror accommodated within the housing and configured to reflect light of a light source;
 a lens accommodated within the housing and arranged on an optical path of the light reflected by the polygon mirror; and
 a cover member mounted to the housing and provided with an opening formed so as to expose at least a portion of the lens,
 wherein the opening is closed by a seal member which is attached to a portion of the lens exposed from the opening and an outer wall surface of the cover member existing around the opening, and
 wherein a surface of the lens exposed from the opening is disposed on the same plane as the outer wall surface of the cover member existing around the opening.

2. The optical scanner of claim 1, wherein the seal member is higher in heat conductivity than the cover member.

3. The optical scanner of claim 1, wherein the seal member is formed of an adhesive sheet.

4. The optical scanner of claim 1, wherein the light source is a laser light source, and the seal member is a laser caution label which urges a user to be careful in handling the laser light source.

5. An image forming device provided with the optical scanner of claim 1.

* * * * *